(12) United States Patent
Chelba et al.

(10) Patent No.: US 8,306,818 B2
(45) Date of Patent: Nov. 6, 2012

(54) DISCRIMINATIVE TRAINING OF LANGUAGE MODELS FOR TEXT AND SPEECH CLASSIFICATION

(75) Inventors: Ciprian Chelba, Seattle, WA (US);
Alejandro Acero, Bellevue, WA (US);
Milind Mahajan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 399 days.

(21) Appl. No.: 12/103,035

(22) Filed: Apr. 15, 2008

(65) Prior Publication Data
US 2008/0215311 A1 Sep. 4, 2008

Related U.S. Application Data

(63) Continuation of application No. 10/453,349, filed on Jun. 3, 2003, now Pat. No. 7,379,867.

(51) Int. Cl.
*G10L 15/00* (2006.01)
*G06F 17/27* (2006.01)
(52) U.S. Cl. ............................. 704/236; 704/9; 704/240
(58) Field of Classification Search .............. 704/1, 200, 704/225, 236
See application file for complete search history.

(56) References Cited

U.S. PATENT DOCUMENTS

| | | | | |
|---|---|---|---|---|
| 5,455,889 | A * | 10/1995 | Bahl et al. | 704/236 |
| 5,467,425 | A * | 11/1995 | Lau et al. | 704/243 |
| 5,768,603 | A * | 6/1998 | Brown et al. | 704/9 |
| 6,157,912 | A * | 12/2000 | Kneser et al. | 704/270 |
| 6,466,908 | B1 * | 10/2002 | Baggenstoss | 704/256 |
| 6,640,207 | B2 * | 10/2003 | Witschel | 704/9 |
| 6,778,951 | B1 * | 8/2004 | Contractor | 704/9 |
| 6,904,017 | B1 * | 6/2005 | Meempat et al. | 370/238 |
| 7,219,056 | B2 * | 5/2007 | Axelrod et al. | 704/235 |
| 2002/0116174 | A1 * | 8/2002 | Lee et al. | 704/9 |
| 2003/0061201 | A1 * | 3/2003 | Grefenstette et al. | 707/3 |
| 2006/0080314 | A1 * | 4/2006 | Hubert et al. | 707/5 |

OTHER PUBLICATIONS

Gopalakrishnan et al, "An inequality for rational functions with applications to some statistical estimation problems", 1991, IEEE transactions on Information Theory, vol. 37, pp. 107-113.*
Woodland et al, "Large scale discriminative training for speech recognition", 2000, In Proc. of ISCA, pp. 1-10.*
Warnke et al, Discriminative Estimation of Interpolation Parameters for Language Model Classifiers, 1999, In Proc. ICASSP '99, pp. 525-528.*
Valchev et al "MMIE Training of Large Vocabulary Recognition Systems", 1997, ElsevierSciences, pp. 303-314.*
Bahl et al, "Maximum Mutual Information Estimation of Hidden Markov Model parameters for Speech Recognition", 1986, In Proc. Int. Conf. on Acoustics, Speech and Signal Proc., pp. 1-4.*

(Continued)

*Primary Examiner* — Richemond Dorvil
*Assistant Examiner* — Olujimi Adesanya
(74) *Attorney, Agent, or Firm* — Westman, Champlin & Kelly, P.A.

(57) ABSTRACT

Methods are disclosed for estimating language models such that the conditional likelihood of a class given a word string, which is very well correlated with classification accuracy, is maximized. The methods comprise tuning statistical language model parameters jointly for all classes such that a classifier discriminates between the correct class and the incorrect ones for a given training sentence or utterance. Specific embodiments of the present invention pertain to implementation of the rational function growth transform in the context of a discriminative training technique for n-gram classifiers.

10 Claims, 5 Drawing Sheets

OTHER PUBLICATIONS

Povey et al, "Minimum Phone Error and I-Smoothing for Improved Discriminative Training", May 13-17, 2002, In Proc. ICASSP, vol. 1, pp. 1-4.*

Nadas, "A Decision Theoretic Formulation of a training Problem in Speech Recognition and a Comparison of Training by Unconditional Versus Conditional Maximum Likelihood", 1983, IEEE Transactions on Acoustics, Speech and Signal Proc., vol. 31, No. 4, pp. 814-817.*

Rathinavelu et al, "Use of Generalized Dynamic Feature Parameters for Speech Recognition", May 1997, IEEE Transactions on Speech and Audio Proc. vol. 5, No. 3, pp. 232-242.*

Chelba, "Exploiting Syntactic Structure for Natural Language Modeling", 2000, Thesis (Ph. D.)Johns Hopkins University, 2000.*

Hong-Kwang et al, Discriminative Training of Natural Language Call Routers, Jan. 2003, IEEE Transactions on Speech and Audio Proc., vol. 11, No. 1, pp. 24-35.*

Xiaoqiang Luo. Growth transform of a sum of rational functions and its application in estimating HMM parameters. In Proc. SST-98, 1998, pp. 1-6.*

Schlueter et al, "Comparison of discriminative training criteria and optimization methods for speech recognition" Speech Communication, vol. 34, No. 3, pp. 287-310, 2001.*

Gopalakrishnan, P.S. et al., "An Inequality for Rational Functions With Applications to Some Statistical Estimation Problems," IEEE Transactions on Information Theory, vol. 37, No. 1, pp. 107-113 (Jan. 1991). Abstract only.

Jelinek and Mercer, F. & R.; "Interpolated estimation of Markov source parameters from sparse data," Pattern Recognition in Practice, E. Gelsema and L. Kanal, Eds., pp. 381-397, 1980.

Chelba, C.; and Acero, A.; "Speech Utterance Classification," Microsoft Research, Jun. 4, 2003, pp. 1-4.

Hong-Kwang, J. et al.; "Discriminative Training of Language Models for Speech Recognition," IEEE Transactions, 2002, pp. 325-328.

Chelba, C. and Acero, A.; "Discriminative Training of N-gram Classifiers for Speech and Text Routing," Microsoft Research, Sep. 2003, pp. 1-4.

Douglas B. Paul et al.; "On the Interaction between True Source, Training, and Testing Language Models," IEEE Transactions 1991, pp. 569-572.

European Search Report.

Office Action dated Mar. 15, 2007 for parent U.S. Appl. No. 10/453,349, filed Jun. 3, 2003.

Amendment dated Jun. 15, 2007 for parent U.S. Appl. No. 10/453,349, filed Jun. 3, 2003.

Office Action dated Aug. 24, 2007 for parent U.S. Appl. No. 10/453,349, filed Jun. 3, 2003.

Amendment dated Oct. 10, 2007 for parent U.S. Appl. No. 10/453,349, filed Jun. 3, 2003.

Final Office Action dated Dec. 19, 2007 for parent U.S. Appl. No. 10/453,349, filed Jun. 3, 2003.

Amendment After Final dated Jan. 18, 2008 for parent U.S. Appl. No. 10/453,349, filed Jun. 3, 2003.

Official Action—Notice of Rejection dated Jan. 13, 2011, for related Korean application Serial No. 10-2004-40068, filed Jun. 2, 2004. Best Available Translation.

Communication/First Office Action dated Mar. 19, 2012 for related European Application Serial No. 04011405.0, filed May 13, 2004, 5 pgs.

* cited by examiner

DISCRIMINATIVE TRAINING OF LANGUAGE MODELS FOR TEXT AND SPEECH CLASSIFICATION

CROSS-REFERENCE TO RELATED APPLICATION

The present application is a continuation of and claims priority of U.S. patent application Ser. No. 10/453,349, filed Jun. 3, 2003, the content of which is hereby incorporated by reference in its entirety.

BACKGROUND OF THE INVENTION

The present invention deals with text and speech classification. More specifically, the present invention deals with an enhancement of language models to improve classification accuracy.

Natural language understanding involves using a computer to determine the meaning of text or speech generated by a user. One step in determining the meaning of natural language input is to classify the input into one of a set of predetermined classes. For example, a specific input such as "I want to book a flight to Rome" could be classified into a Travel Arrangements class. An application dedicated to this class could then be invoked to decipher further information from the input and execute the user goal represented by the input.

Such classification is a well-defined problem in natural language processing. Specific examples of practical applications include call routing for automated call centers and natural language based help systems.

Classifiers can be used to facilitate the classification process. Common examples of classifiers include statistical classifiers such as n-gram, Naive Bayes and Maximum Entropy classifiers. In n-gram classifiers, statistical language models are used to assign natural language word strings (i.e., sentences) to a class. Specifically, a separate n-gram language model is constructed for each class. At run-time, the language models are used in parallel to assign a probability to a given test word string or speech utterance. The class associated with the language model demonstrating the highest probability to the test word string or utterance is designated as the class to which the string/utterance belongs. The class assignment need not be one-to-one. The test sentence or utterance can be assigned to a set of N-best class candidates depending on the probability that each class receives given the test string or utterance. For speech classification, n-gram classifiers have the advantage that they can be used in a one-pass scenario wherein speech utterance recognition and classification are integrated.

A straightforward way of training an n-gram classifier is to train the language model for each class separately using maximum likelihood (ML) estimation. Although such training schemes are easy to implement, they produce a classifier with limited classification accuracy.

SUMMARY OF THE INVENTION

Embodiments of the present invention pertain to a way of training language models such that the conditional likelihood of a class given a word string, which is very well correlated with classification accuracy, is maximized.

The method comprises tuning statistical language model parameters jointly for all classes such that a classifier discriminates between the correct class and the incorrect ones for a given training sentence or utterance. Specific embodiments of the present invention pertain to implementation of the rational function growth transform in the context of a discriminative training technique for n-gram classifiers.

DETAILED DESCRIPTION OF ILLUSTRATIVE EMBODIMENTS

I. EXEMPLARY OPERATING ENVIRONMENTS

Various aspects of the present invention pertain to conditional maximum likelihood (CML) estimation of language models used for text or speech utterance classification. However, prior to discussing the invention in more detail, one embodiment of an exemplary environment in which the present invention can be implemented will be discussed.

Figure 1:
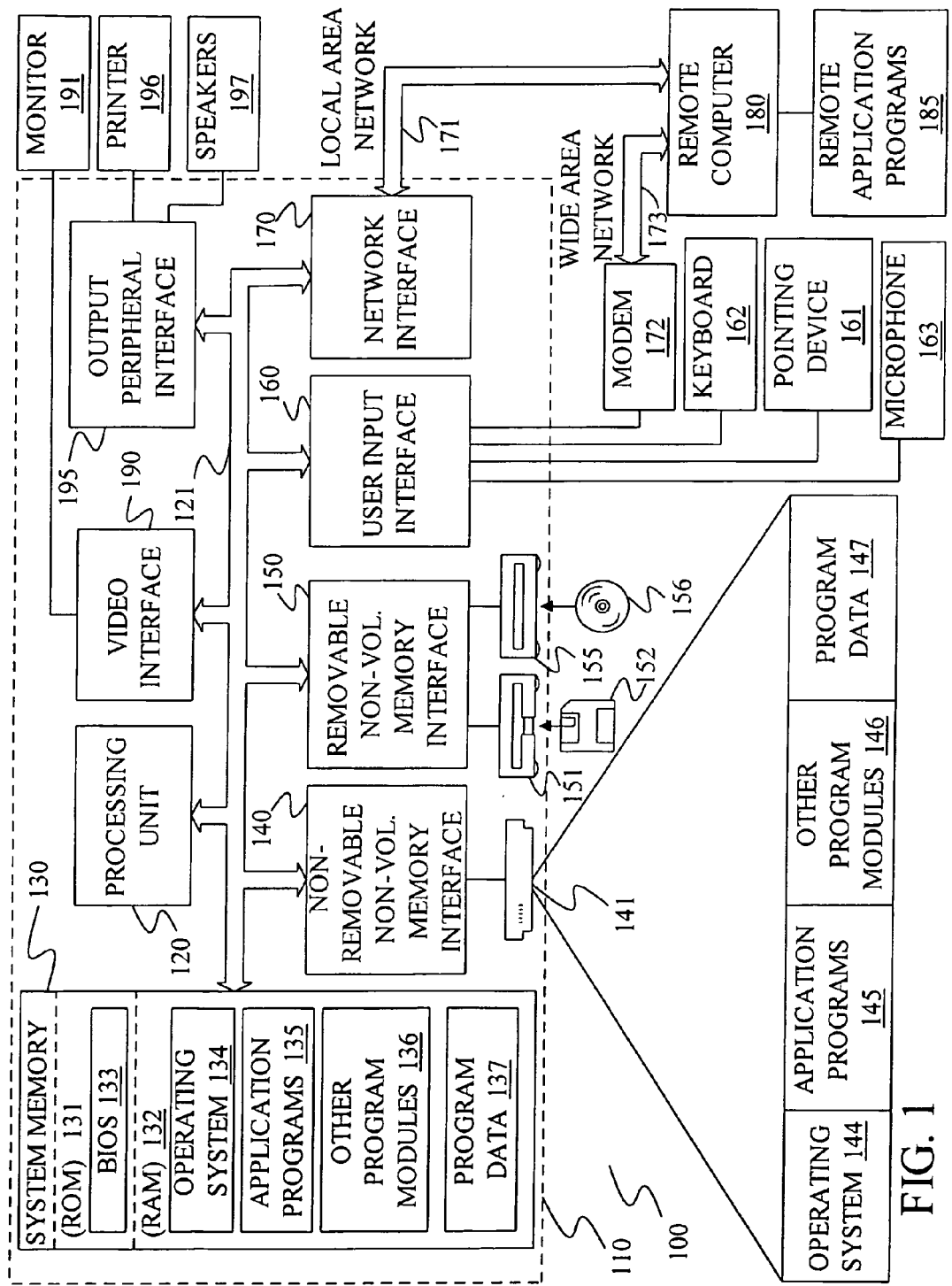
FIG. 1 is a block diagram of one illustrative environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices. Tasks performed by the programs and modules are described below and with the aid of figures. Those skilled in the art can implement the description and figures as processor executable instructions, which can be written on any form of a computer readable media.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

II. OVERVIEW OF TASK CLASSIFICATION SYSTEM

Figure 2:
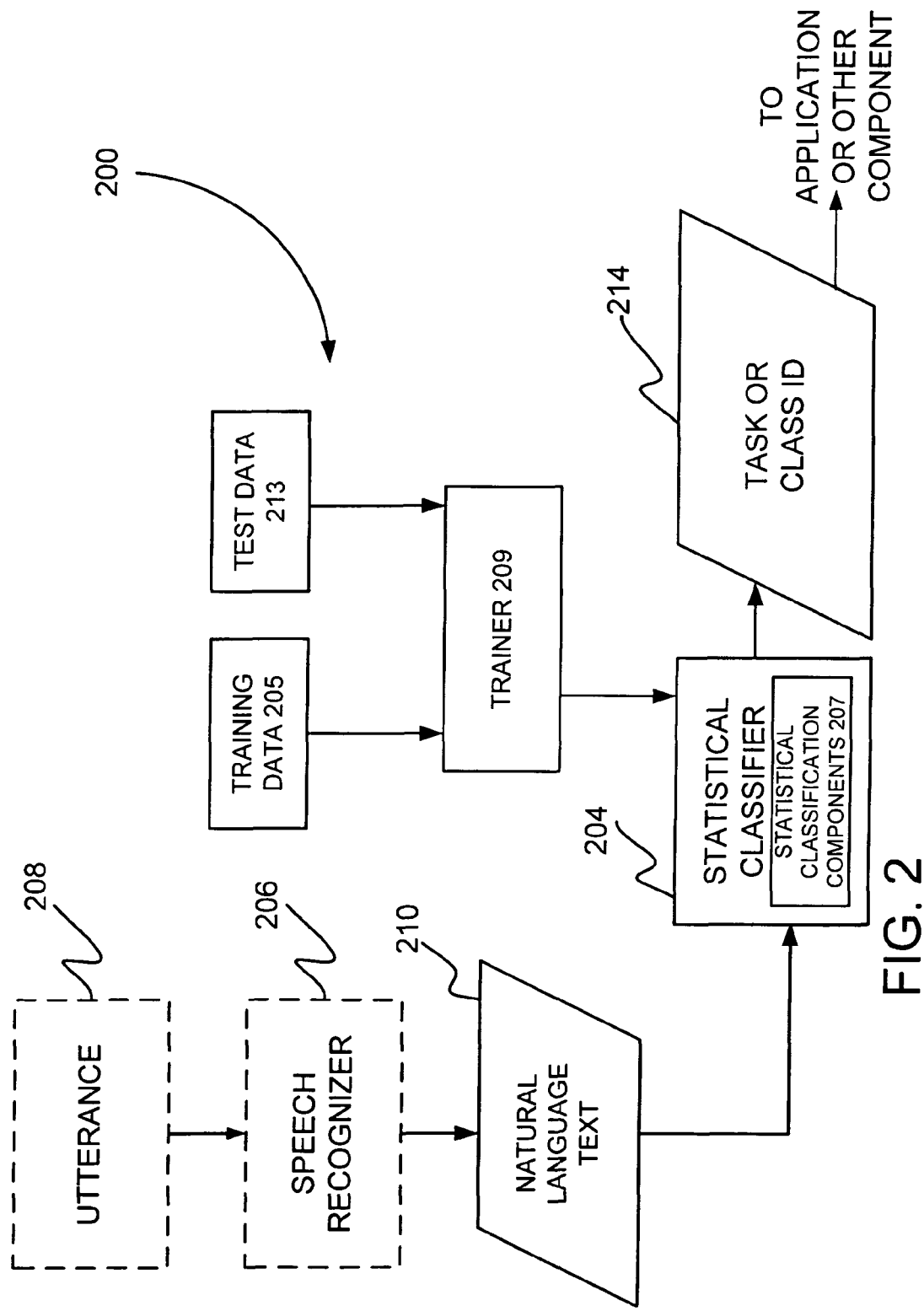
FIG. 2 is a block diagram of a portion of a natural language classification system.

FIG. 2 is a block diagram of a portion of a natural language classification system 200. System 200 includes a statistical classifier 204.

System 200 can also include optional speech recognition engine 206. Where interface 200 is to accept speech signals as an input, it includes the recognizer 206. However, where interface 200 is to receive textual input, recognizer 206 is not needed. The present discussion will proceed with respect to an embodiment in which speech recognizer 206 is present, although it will be appreciated that it need not be present in other embodiments. Also, other natural language communication modes can be used, such as handwriting or other modes. In such cases, suitable recognition components, such as handwriting recognition components, are utilized.

In order to perform class or task classification, system 200 first receives an utterance 208 in the form of a speech signal that represents natural language speech spoken by a user. Speech recognizer 206 performs speech recognition on utterance 208 and provides, at its output, natural language text 210. Text 210 is a textual representation of the natural language utterance 208 received by speech recognizer 206. Speech recognizer 206 can be any known speech recognition system that performs speech recognition on a speech input. Speech recognizer 206 may include an application-specific dictation language model, but the particular way in which speech recognizer 206 recognizes speech does not form a major part of the present invention. Similarly, in another embodiment, speech recognizer 206 outputs a list of results or interpretations with respective probabilities. Later components operate on each interpretation and use the associated probabilities in class or task classification.

In accordance with one embodiment, all or a portion of natural language text 210 is provided to statistical classifier 204 for analysis and classification. A portion might be provided in instances where preprocessing is utilized to remove certain elements (i.e., articles such as a, an, the, etc.) from text 210. In accordance with another embodiment, a less direct representation of natural language text 210 (i.e., a vector representation) is provided to statistical classifier 204 for analysis and classification.

In accordance with one embodiment, a set of features is extracted from the natural language text for submission to statistical classifier 204. The set of features will illustratively be those found to be most helpful in performing task classification. This can be empirically, or otherwise, determined.

In one embodiment, the extracted features are a set of word identifiers that indicate the presence or absence of words in the natural language input text 210. For example, only words in a certain vocabulary designed for a specific application might be tagged for consideration by classifier 204, and words outside the vocabulary are mapped to a distinguished word-type such as <UNKNOWN>.

It should be noted that more complex types of features can be selected for consideration as well. For example, the co-occurrences of words can be selected features. This may be used, for instance, in order to more explicitly identify tasks to be performed. For example, the co-occurrence of the words "send mail" may be a feature noted to be of particular importance for processing by statistical classifier 204. If these two words are found, in this order, in the input text, then statistical classifier 204 will receive notification of the fact. A wide variety of other features can be selected as well, such as bi-grams, tri-grams, other n-grams, and any other desired features.

Preprocessing can optionally be performed on natural language text 210 to facilitate the processing of text 210 prior to a feature extraction process. For example, it may be desirable that natural language text 210 only include indications of the presence or absence of words that have been predetermined to carry certain types of content.

Stemming can also be used prior to feature extraction. Stemming is a process of removing morphological variations in words to obtain their root form. Examples of morphological variations include inflectional changes (such as pluralization, verb tense, etc.) and derivational changes that alter a word's grammatical role (such as adjective versus adverb as in slow versus slowly, etc). Stemming can be used to condense multiple features with the same underlying semantics into single features. This can help overcome data sparseness, improve computational efficiency, and reduce the impact of the feature independence assumptions used in statistical classification methods.

In any case, statistical classifier 204 receives the natural language text 210 information and utilizes statistical classification components 207 to classify the information into one or more of a plurality of predefined classes or tasks. Components 207 are illustratively any of a variety of statistical language models such as those associated with n-gram, Naive Bayes or Maximum Entropy classifiers. A trainer 209 illustratively trains the language models utilizing a collection of training data 205 and test data 213. Test data 213 is illustratively a limited amount of data held back from training data 205 to facilitate the training process.

The theory underlying the task or class identification performed by classifier 204 will now be described in greater detail. To fix notation, a speech utterance is hereinafter denoted with A. The word string that gave rise to utterance A is denoted with $W = w_1 \ldots w_n$. The class of utterance A is denoted with C(A). The word vocabulary is denoted with v, and the class vocabulary with C. The corpus, split into training and test data, T and $\epsilon$, respectively, consists of tuples (or samples) s containing: utterance A, transcription W and utterance class C(A). For reference, the performance of a given classifier is measured by the class error rate (CER):

$$CER = \sum_{s \in \mathcal{E}} \delta(C(s.A), \hat{C}(s.A)) \qquad (1)$$

where s.A denotes the acoustics in sample s and $\delta(\ldots)$ is the Kronecker-$\delta$ operator, which is equal to one when its arguments are equal to each other and is equal to zero otherwise.

In the context of an n-gram language model classifier, assuming a two-pass scenario, an n-gram model $P(w_i | w_{i-1}, \ldots, w_{i-n+1}, C)$ is built for each class $C \in \mathcal{C}$ by pooling transcriptions that have been labeled with class C. A pooled n-gram language model $P(w_i | w_{i-1}, w_{i-n+1})$ is built from all the training transcriptions in addition to the class specific language models P(.|C). Each test utterance is then assigned a class by doing text classification on the 1-best recognition output using the pooled language model:

$$\text{Most likely class} = \hat{C}(A) = \underset{C}{\arg\max} \log P(\hat{W} | C) + \log P(C) \qquad (2)$$

$$\text{Most likely word sequence} = \hat{W} = \underset{W}{\arg\max} \log P(A | W) + \log P(W) \qquad (3)$$

This is a two-pass approach where the first step of Equation 2 is performed by speech recognizer 206 and the second step of Equation 2 is performed by statistical classifier 204. The second stage of the two-pass approach illustratively implements an n-gram text classifier.

The n-gram type of classifier has a special potential efficiency advantage in that it can be used in a single-pass system wherein a given speech utterance is assigned a class concurrently with speech recognition. In addition, it is worth noting that the n-gram type of classifier is advantageous in that it enables consideration of word co-occurrences of a relatively high order. For example, consideration of tri-grams involves the examination of word triplets. Even if only uni-grams are considered, the number of occurrences of the word will be considered in an n-gram classifier.

Figure 3:
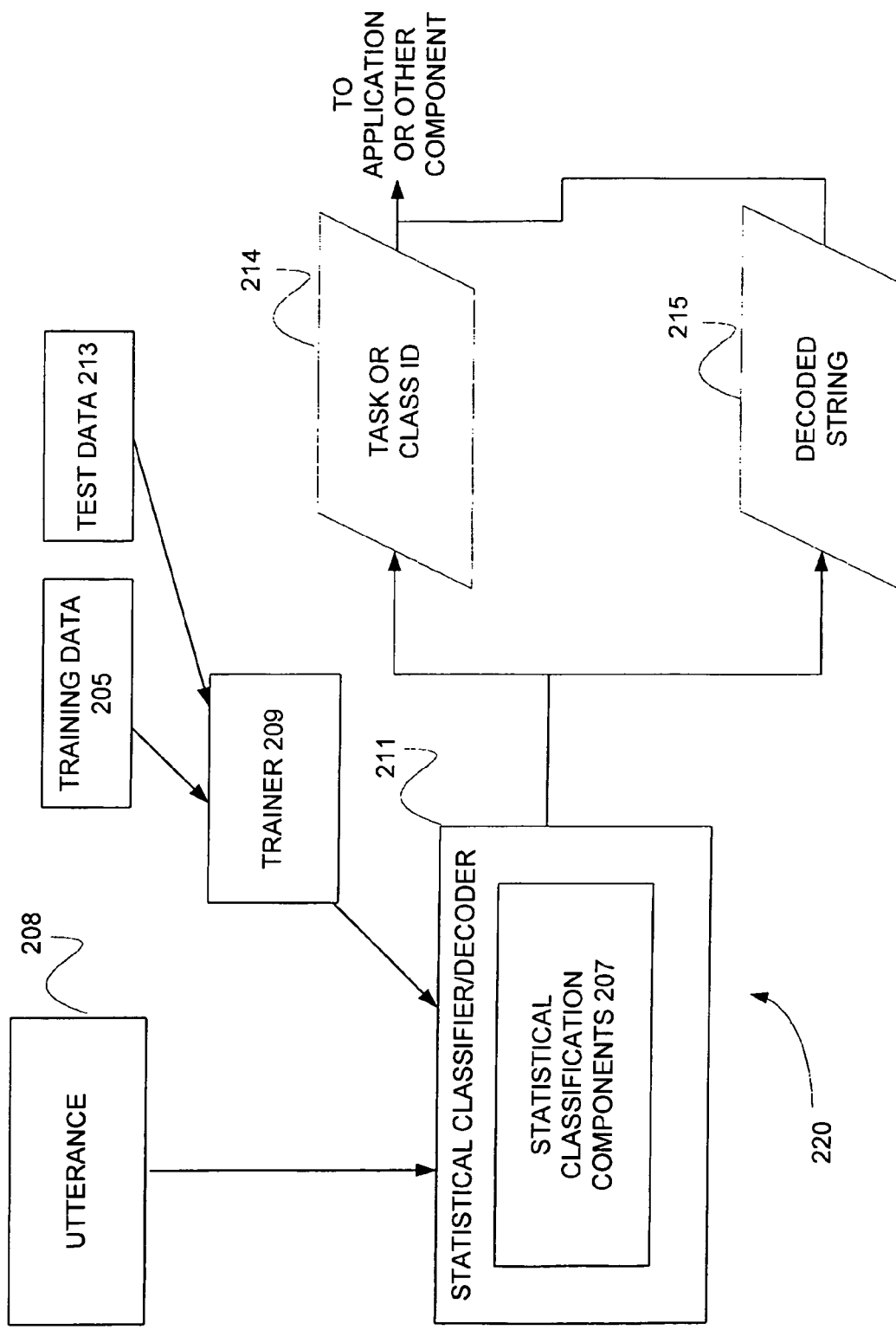
FIG. 3 is a block diagram of a portion of another natural language classification system.

FIG. 3 is an illustration of a portion of a single-pass classification system 220. Elements in FIG. 3 having the same or similar functionality as elements in FIG. 2 have been labeled with the same or similar reference numerals.

System 220 (FIG. 3) is different than system 200 (FIG. 2) in that it includes a statistical classifier/decoder 211. Classifier/decoder 211 illustratively decodes and classifies utterance 208 in a single pass. Classifier/decoder 211 includes statistical classification components 207 (i.e., language models) that are trained by trainer 209. Components 207 are illustratively n-gram language models configured for a single-pass system whereby a given utterance A is assigned a class $\hat{C}(A)$ concurrently with speech decoding that finds the word string $\hat{W}$.

In accordance with the single pass system of FIG. 3, an n-gram model $P(w_i|w_{i-1}, \ldots, W_{i-n+1},C)$ is built for each class $C \in C$ by pooling all the training transcriptions that have been labeled with class C. A recognition network is constructed by stacking each of the language models $P(.|C)$, with associated labels for each class, in parallel. The transition into each language model $P(.|C)$ has a score log P(C). In one pass, the most likely path is identified as follows:

$$(\hat{C}(A),\hat{W})=$$

$$\arg\max_{(c,w)} \log P(A|W) + \log P(W|C) + \log P(C) \quad (4)$$

Accordingly, upon receipt of utterance 208, classifier/decoder 211 is able to assign a class concurrently with speech decoding. The word string that is recognized as being most likely will have a class tag that is returned with the string. The output is a task or class ID 214 and a decoded string 215. Decoded string 215 is illustratively a word string representation of utterance 208.

In the context of both one and two pass systems, n-gram language models can be smoothed to accommodate for unseen training data. In accordance with one embodiment, the n-gram probabilities for the class specific training models are estimated using linear interpolation of relative frequency estimates at different orders (such as 0 for a uniform model, n−1 for a n-gram model). The linear interpolation weights at different orders are bucketed according to context counts, and their values are estimated using maximum likelihood techniques on cross-validation data. The n-gram counts from the cross-validation data are then added to the counts gathered from the main training data to enhance the quality of the relative frequency estimates. Such smoothing is set out in greater detail in Jelinek and Mercer, *Interpolated Estimation of Markov Source Parameters From Sparse Data*, Pattern Recognition in Practice, Gelsema and Kanal editors, North-Holland (1980). This is one example of smoothing.

There are other ways to define the process of smoothing. In accordance with another embodiment of smoothing, in order to estimate n-gram language models, a recursive deleted interpolation scheme is utilized between relative frequency estimates at different orders, $f_k(.)$, k=0 ... n:

$$P_n(w|h_n)=\lambda(h_n) \cdot p_{-1}(W|H_{n-1})+\overline{\lambda(h_n)} \cdot f_n(w|h_n)$$

$$P_{-1}(w)=\text{uniform}(v) \quad (5)$$

where $$\overline{\lambda(h_n)}=1-\lambda(h_n)$$

$$h_n=w_{-1}, \ldots, w_{-n}$$

The relative frequencies, $f_n(w/h_n)$, and interpolation weights, $\lambda(h_n)$, are estimated using maximum likelihood estimation from main and held-out data, respectively, obtained by a 70/30% random split of training data available to a given language model. The interpolation weights are bucketed according to the context count:

$$\lambda(h_n)=\lambda_{(ML}(h_n)) \quad (6)$$

where $C_{ML}(h_n)$ is the number of times the context $h_n$ is found in the training data assigned to the class.

Generally speaking, classifiers 204 and 211 are configured to output a task or class identifier 214 identifying the particular task or class assigned to corresponding natural language input. Identifier 214 can alternatively be a ranked list (or n-best list) of task or class identifiers. The identifier 214 is provided to an application or other component that can take action based on the identified task. For example, if the identified task is to SendMail, identifier 214 is sent to an electronic mail application which can in turn display an electronic mail template for use by a user. Of course, any other task or class is contemplated as well. Similarly, if an n-best list of identifiers 214 is output, each item in the list can be displayed through a suitable user interface such that a user can select the desired class or task. Note that the decoded string 215 is typically also provided to the application.

III. TASK OR CLASS IDENTIFICATION

Figure 4:
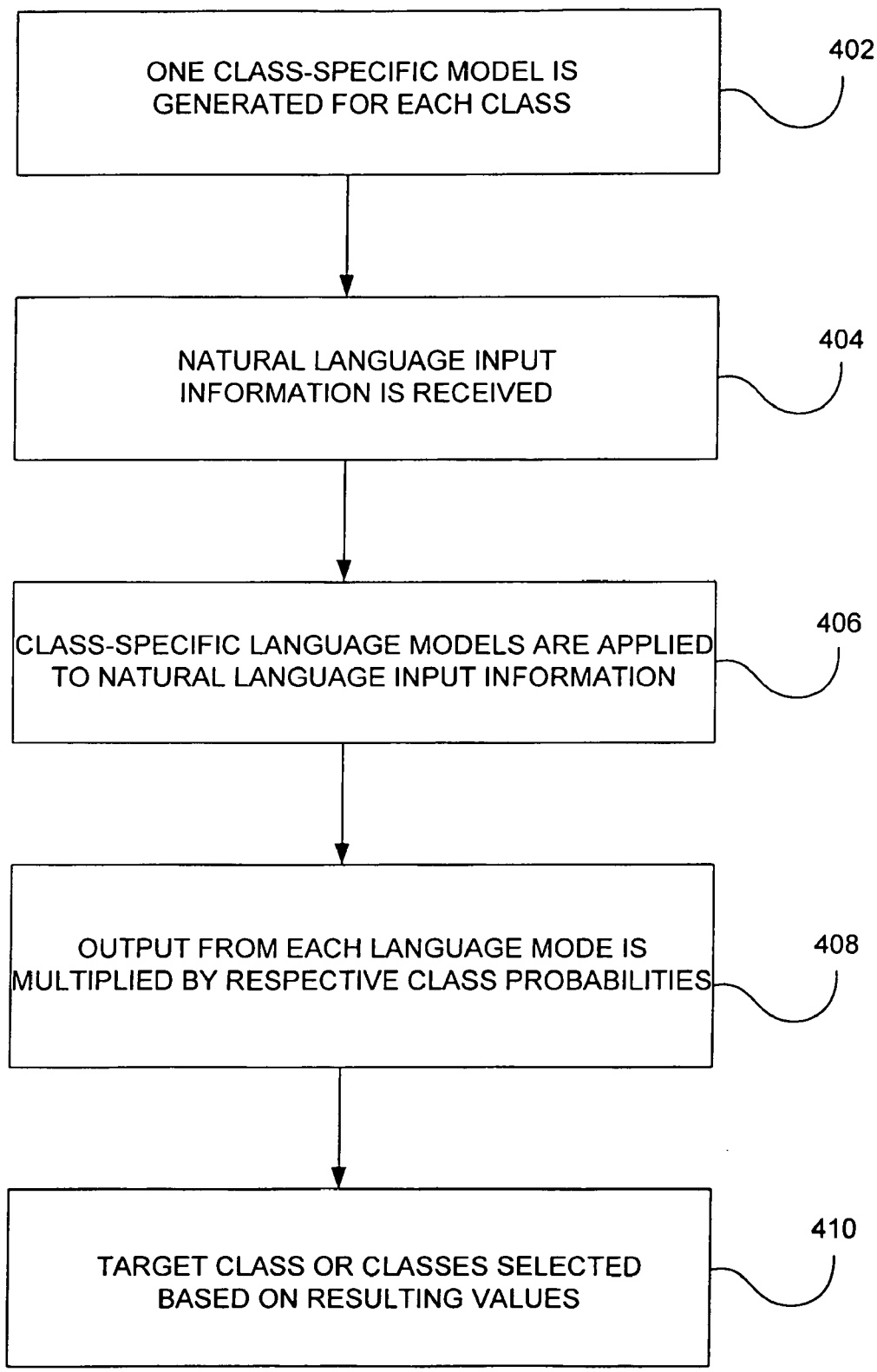
FIG. 4 is a flow chart illustrating steps associated with task or class identification.

FIG. 4, in accordance with one embodiment of the present invention, is a flow chart illustrating steps associated with a method of task or class identification. It should be noted that the method could be customized for either a one-pass or a two-pass system as described above in relation to FIGS. 2 and 3. The classifier utilizes classification components 207, which are illustratively a set of class-dependent n-gram statistical language model classifiers. In accordance with block 402, one class specific model is generated for each class or task. Therefore, when natural language input 210 is received (block 404), the class specific language models are run on that information for each class (block 406). The output from each language model is multiplied by a prior probability for the respective class (block 408). The class with the highest resulting value illustratively corresponds to the target class (block 410).

Figure 5:
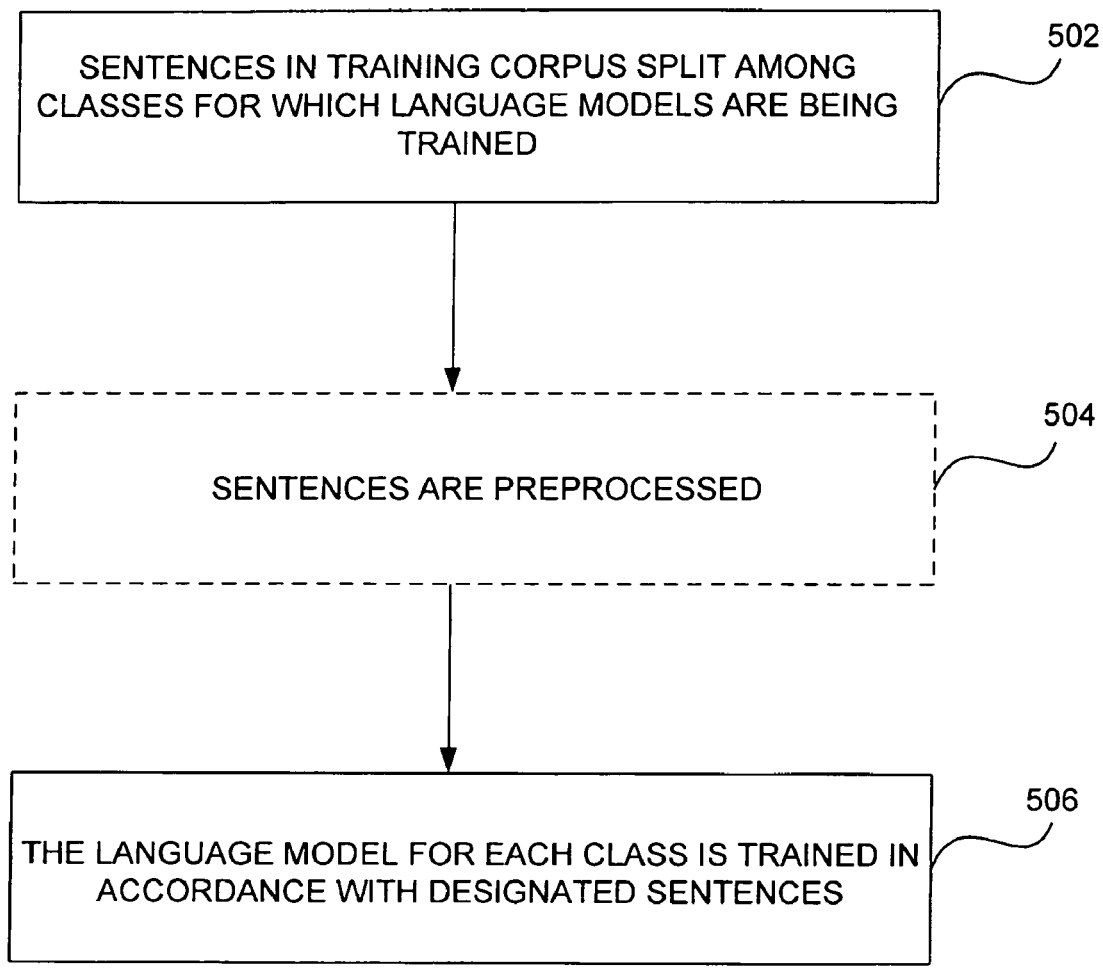
FIG. 5 is a flow chart illustrating steps associated with training class specific language models.

FIG. 5, in accordance with one embodiment, is a flow chart illustrating steps associated with the training of class specific language models. Such training is illustratively carried out by trainer 209 (FIGS. 2 and 3). In accordance with block 502, class specific n-gram language models are trained by splitting sentences in a training corpus among the various classes for which n-gram language models are being trained. In accordance with block 506, the sentences corresponding to each class are used in training the n-gram classifier for that class. This yields a given number of n-gram language models, wherein the number corresponds to the total number of classes to be considered. It should be noted that, in accordance with block 504, feature extraction techniques such as stemming and other forms of preprocessing can optionally be applied to sentences prior to training. The preprocessing could occur before or after sentences are divided among classes. Also, step 506 may include defining the language models using smoothing to help reduce the effects of sparse data as described above.

IV. CONDITIONAL MAXIMUM LIKELIHOOD (CML) ESTIMATION OF N-GRAM CLASSIFIERS

Under some embodiments of the present invention, training step 506 is performed utilizing a conditional maximum likelihood (CML) estimation scheme. The CML training scheme enables statistical language model parameters to be trained jointly for all classes such that the classifier discriminates between the correct class and the incorrect ones for a given training sentence or utterance.

Under one embodiment, the language models $P(W|C)$, $\forall C$ are jointly trained such that the class error rate (Equation 1) is minimized. Since the CER is not analytically tractable, a convenient substitute is the conditional probability $$\prod_{i=1}^{T} P(s_i.C \mid s_i.A)$$

for speech utterance classification or $$\prod_{i=1}^{T} P(s_i.C \mid s_i.W)$$

for text classification, where T is the number of samples in the training data, $|s_i.A$ represents the acoustics in training sample i, $|s_i.C$ is the class associated with training sample i and $|s_i.W$ is the sentence (word string) associated with training sample i. The choice is justified by an inverse correlation with the CER on the training data (equal to the expected probability of error on the training data).

Restricting attention to the text only case, it is desirable to tune the language models $P(W|C)$, $\forall C$ to maximize the conditional log-likelihood:

$$L(C \mid W) = \sum_{i=1}^{T} \log P(s_i \cdot C \mid s_i \cdot W) \quad (7)$$

where:

$$P(C \mid W) = P(C) \cdot P(W \mid C) \Big/ \sum_{L \in C} P(L) \cdot P(W \mid L) \quad (8)$$

The goal becomes to maximize the objective function of equation (7). For efficiency reasons, it is desirable to keep the same parameterization as in the maximum likelihood (ML) case (see Eq. 5) for the class specific language models. For example, it is desirable to keep the same $\lambda$ and $f_n$ parameters as in the ML case (although determining different values for the parameters). The storage requirements and run time should illustratively be the same as for the ML models. This is an optional constraint and could be removed.

It is worth noting that for speech utterance classification, the language model $P(W|C)$, $\forall C$ can be tuned such that the conditional likelihood $L(C|A)$ is maximized:

$$L(C \mid A) = \sum_{i=1}^{T} \log P(s_i \cdot C \mid s_i \cdot A) \quad (9)$$

where $$P(C \mid A) = P(C, A) \Big/ \sum_{L \in C} P(L, A) \quad (10)$$

$$P(C, A) = P(C) \sum_{w \in v^*} P(W \mid C) \cdot P(A \mid W) \quad (11)$$

A notable difference between tuning the language models for maximizing $L(C|A)$ (Eq. 9) versus $L(C|W)$ (Eq. 7) is that in the former case the language model will take into account the acoustic confusability between words and will try to discount the contribution of highly confusable words to the classification result.

Maximizing $L(C|W)$ requires word transcriptions along with class labels for language model training (the acoustic data is not used for language model training). Since the resulting models are n-grams they can be easily used for both speech and text classification.

V. RATIONAL FUNCTION GROWTH TRANSFORMATION FOR CML N-GRAM PARAMETER ESTIMATION

As has been described, each class specific n-gram model is parameterized according to Equation 5. The goal of the CML estimation procedure is to tune the relative frequency values $f_n(w|w_{-1}, \ldots, w_{-n})$ as well as the interpolation weights $\lambda(W_{-1}, \ldots, w_{-n})$ at all orders $0 \ldots n-1$ such that the conditional likelihood of the training data $L(C|W)$ (see Equation 7) is maximized.

In accordance with one aspect of the present invention, an efficient and effective optimization technique is the rational function growth transform (RFGT). The RFGT algorithm, which is a known mathematical application, is described in detail in P.S. Gopalakrishanan et al., *An inequality for rational functions with applications to some statistical estimation problems, IEEE Transaction on Information Theory,* Vol. 37, No. 1, pp. 107-113, January 1991. The RFGT procedure is particularly appropriate for the presently described application because it operates on probability distributions and thus it enforces proper normalization of the probability distributions underlying model parameterization at each iteration.

Under the parameterization in Equation 5, the re-estimation equations for the relative frequency $f_k(w|h_k,c)$ of order k are:

$$\hat{f}_k(w \mid h_k, c) = \quad (12)$$

$$\frac{f_k(w \mid h_k, c) + \beta(h_k, c) \frac{\prod_{l=k+1}^{n} \lambda_l(h_1, c)\overline{\lambda_k(h_k, c)}}{P_{n(w|h_n,c)}} f_k(w \mid h_k, c) \cdot \frac{C_{CML(w,h_k,c)}}{C_{ML(h_k,c)}}}{norm(h_k, c)}$$

$$norm(h_k, c) =$$

$$1 + \beta(h_k, c) \sum_{w \in v} \frac{\prod_{l=k+1}^{n} \lambda_l(h_l, c)\overline{\lambda_k(h_k, c)}}{P_n(w \mid h_n, c)} f_k(w \mid h_k, c) \cdot \frac{C_{CML}(w, h_k, c)}{C_{ML}(h_k, c)}$$

where $C_{ML}(w, h_k, c)$ denotes the maximum likelihood count of $(w,h_k)$ in sentences of class c gathered from the training data:

$$C_{ML}(w, h_k, c) = \sum_{i=1}^{T} C((w, h_k) \in s_i \cdot W) \cdot \delta(c, s_i.C) \quad (13)$$

$C_{CML}(w,h_k,c)$ denotes the "CML count" of $(w,h_k)$ in sentences of class c:

$$C_{CML}(w, h_k, c) = \sum_{i=1}^{T} C((w, h_k) \in s_i \cdot W) \cdot [\delta(c, s_i.C) - P(c \mid s_i \cdot W)] \quad (14)$$

with the probability P(c|W) of a class c given a sentence W=$w_1, \ldots, w_q$ being assigned using the class specific n-gram models $P_n(w|h,c)$ and the prior probability on classes P(c):

$$P(c \mid W) = \frac{P(c) \cdot P(W \mid c)}{\sum_{d \in C} P(d) \cdot P(W \mid d)} \quad (15)$$

$$P(W \mid c) = \prod_{i=1}^{q} P_n(w_i \mid h_i, c) \quad (16)$$

The context sensitive "CML weight" $\beta(h_k,c)$ is set to $\beta_{max} > 0$ at each iteration. Following development, its value is then lowered for each context $\beta(h_k,c)$ separately such that the numerator in Equation 12 is non-negative for all events (w,$h_k$, c):

$$f_k(w \mid h_k, c) + \quad (17)$$

$$\beta(h_k, c) \frac{\prod_{l=k+1}^{n} \lambda_l(h_l, c)\overline{\lambda_k(h_k, c)}}{P_n(w \mid h_n, c)} f_k(w \mid h_k, c) \cdot \frac{C_{CML}(w, h_k, c)}{C_{ML}(h_k, c)} > \varepsilon$$

It should be noted that for most contexts ($h_k$,c) this adjustment is not necessary if a low enough $\beta_{max}$ value is chosen to start with. The downside of choosing a small $\beta_{max}$ value is that the relative increase of L(C|W) at each iteration is smaller.

The model parameters are estimated by splitting the training data randomly into main and held-out data. The same partition as the one for ML training is used. The main data is used for estimating the relative frequencies, whereas the held-out data is used for tuning the number of RFGT iterations and the optimal CML weight $\beta_{max}$. The class priors and the interpolation weights are not re-estimated. The initial values for the class priors, relative frequencies and the interpolation weights are illustratively the ML ones. For example, the interpolation weights are those calculated in Equation 5.

The number of RFGT iterations and the optimal CML weight $\beta_{max}$ are illustratively determined as follows:
  Fix a preset number N of RFGT iterations to be run;
  Fix a grid (range of values and step) to be explored for determining the $\beta_{max}$ parameter value;
  For each value $\beta_{max}$ run as many RFGT iterations as possible (no more than N) such that the conditional likelihood L(C|W) of the main data increases at each iteration; and
  Retain the (number of iterations, $\beta_{max}$) pair that maximizes the conditional likelihood L(C|W) of the held-out data as the desired values.

After determining the number of RFGT iterations to be run and the $\beta_{max}$ value, the main and held-out data are pooled and the model is trained using these values.

Although the present invention has been described with reference to particular embodiments, workers skilled in the art will recognize that changes may be made in form and detail without departing from the spirit and scope of the invention.

What is claimed is:

1. A computer-implemented classification method, comprising:
  estimating a set of parameters for each of a plurality of n-gram language models, each n-gram language model being associated with a different category of subject matter, the sets of parameters being estimated utilizing training data that includes main data and held-out data, the sets of parameters including relative frequencies that are estimated using the main data, the relative frequencies being estimated utilizing a context sensitive conditional maximum likelihood (CML) weight, the context sensitive CML weight being set to a maximum value that is greater than zero at each iteration and then lowered separately for each context, the relative frequencies being iteratively re-estimated utilizing a ratio of a maximum likelihood count to a CML count;
  utilizing a computer processor that is a functional component of a computer to produce the sets of parameters for at least two of the n-gram language models jointly in relation to one another through an application of a rational function growth transform, a number of iterations of the rational function growth transform being tuned using the held-out data, the maximum value of the CML weight also being tuned using the held-out data; and
  utilizing the sets of parameters of the plurality of n-gram language models that are produced at least partially jointly in relation to one another as a basis for supporting a determination as to which of the categories of subject matter is best correlated to a given natural language input, wherein the category of subject matter that is best correlated to the given natural language input is information other than a textual representation of the given natural language input itself.

2. The method of claim 1, wherein
the category of subject matter that is best correlated to the given natural language input includes a plurality of categories, the plurality of categories being ranked and displayed to a user through a user interface such that the user can select one of the plurality of categories, and wherein producing the sets for at least two of the n-gram language models jointly in relation to one another comprises producing all sets of parameters of the plurality of n-gram language models jointly in relation to one another.

3. The method of claim 1, wherein
each of the plurality of n-gram language models is associated with a class, wherein producing the sets of parameters for at least two of the n-gram language models jointly comprises producing at least two of the sets of parameters such that a first particular class will have a higher probability value associating it to a particular word string, and such that a second class will have a lower probability value associating it to the particular word string, and wherein the determination as to which of the categories of subject matter is best correlated to a given natural language input comprises outputting a list of results.

4. The method of claim 3, wherein
the particular word string is derived from a training sentence, and wherein the training sentence is preprocessed to remove certain elements to form the particular word string.

5. The method of claim 3, wherein the particular word string is derived from a speech utterance, and wherein acoustic confusability between words is accounted for.

6. The method of claim 1, wherein producing the sets of parameters for at least two of the n-gram language models jointly comprises producing multiple sets of parameters jointly such that the n-gram language models will discriminate between a correct class and incorrect classes for a given training input, and wherein the natural language input comprises a vector representation.

7. The method of claim 1, further comprising training the sets of parameters to accommodate unseen data based upon a recursive deleted interpolation scheme.

8. A computer-implemented classification method, comprising:
    estimating a set of parameters for each of a plurality of n-gram language models, each n-gram language model being associated with a different category of subject matter, the sets of parameters being estimated utilizing training data that includes main data and held-out data, the sets of parameters including relative frequencies that are estimated using the main data, the relative frequencies being estimated utilizing multiple iterations of a rational function growth transformation (RFGT) and a context sensitive conditional maximum likelihood (CML) weight, the context sensitive CML weight being set to a maximum value that is greater than zero at each iteration and then lowered separately for each context, the multiple iterations of the RFGT being preset to a number N, the maximum value of the CML weight being determined utilizing a fix grid having a range of values and steps;
    utilizing a computer processor that is a functional component of a computer to produce the sets of parameters for at least two of the n-gram language models jointly in relation to one another through an application of a rational function growth transform, a number of iterations of the rational function growth transform being tuned using the held-out data, the maximum value of the CML weight also being tuned using the held-out data; and
    utilizing the sets of parameters of the plurality of n-gram language models that are produced at least partially jointly in relation to one another as a basis for supporting a determination as to which of the categories of subject matter is best correlated to a given natural language input, wherein the category of subject matter that is best correlated to the given natural language input is information other than a textual representation of the given natural language input itself.

9. The method of claim 8, wherein for each value of the context sensitive CML weight no more than the number N iterations are performed, and a conditional likelihood of the main data increases at each of the N iterations.

10. The method of claim 8, and further comprising:
    pooling the main data and the held-out data; and
    re-training the plurality of n-gram language models utilizing the pooled data.

* * * * *